Figure 2:
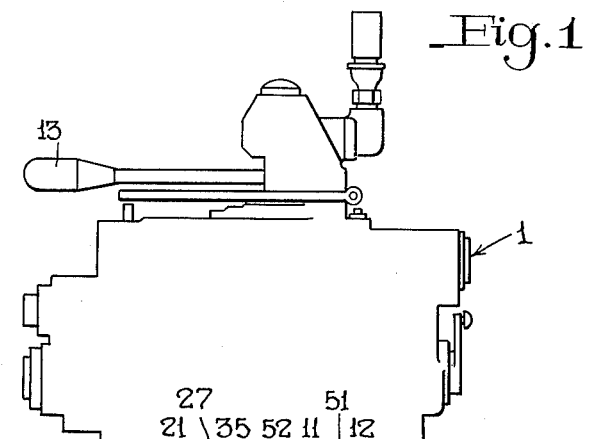

Nov. 30, 1954  E. S. COOK  2,695,817
FLUID PRESSURE BRAKE
Filed Feb. 28, 1951

INVENTOR.
Earle S. Cook
BY
Frank E. Miller
ATTORNEY

United States Patent Office 2,695,817
Patented Nov. 30, 1954

2,695,817

FLUID PRESSURE BRAKE

Earle S. Cook, Forest Hills, Pa., assignor to Westinghouse Air Brake Company, a corporation of Pennsylvania Application February 28, 1951, Serial No. 213,093

5 Claims. (Cl. 303—60)

This invention relates to fluid pressure brake apparatus and more particularly to the locomotive type for controlling application and release of brakes on the locomotive and cars of a train.

In the copending application of Carlton D. Stewart, Serial No. 208,604, filed January 30, 1951, now Patent No. 2,672,375 issued March 16, 1954, and assigned to the assignee of the present application, there is disclosed a fluid pressure brake equipment for a locomotive embodying a feature commonly known as fading maintaining and another feature called flat maintaining and means for automatically selecting either one or the other according to the pressure gradient in the brake pipe of a train, that is, the difference between the pressures in the brake pipe at the head and rear ends of the train at the time of initiating an application of brakes.

One object of the invention is the provision of improved means for accomplishing the above result.

As brought out in the Stewart application fading maintaining is essential to prevent undesired release of a light slack gathering application of brakes on a train if at the time of initiating the application a false gradient in brake pipe pressure is present in the train, that is, the difference in brake pipe pressure at the front and rear ends of the train is greater than it will ever be due to leakage, as will be the case if an application of brakes is initiated before a train brake pipe is fully charged with fluid under pressure.

More specifically, the engineer's brake valve device disclosed in the Stewart application has a first service position for opening the usual equalizing reservoir to a reduction limiting reservoir of such volume as to effect a reduction in pressure in the equalizing reservoir at a service rate and of a limited degree to cause quick service operation of the usual AB valves on cars in a train and thereby a light slack gathering application of brakes, a maintaining valve operating in case of brake pipe leakage to supply fluid under pressure to the brake pipe to compensate for such leakage so that such leakage will be prevented from reducing brake pipe pressure faster than the equalizing reservoir pressure is reduced.

If a false gradient is present in the brake pipe at the time of initiating an application of brakes on the train by moving the engineer's brake valve device to first service position, the reduction limiting reservoir will be open to atmosphere through a fading choke, so that after equalization of pressure of fluid in the equalizing reservoir into the reduction limiting reservoir at a service rate, the pressure of fluid in the equalizing reservoir will continue to reduce, but at a much slower rate, through the fading choke. When the supply of fluid under pressure to the brake pipe is cut off and the application is thus initiated, the pressure in the brake pipe at the front end of the train will reduce by flow toward the rear of the train very rapidly in case of false gradient and leakage and such flow will be augmented by the maintaining valve operating to hold the pressure at the head end of the train equal to reducing equalizing reservoir pressure. The continued reduction in equalizing reservoir pressure through the fading choke however so limits the maintaining valve supply of fluid under pressure to the brake pipe that insufficient increase in brake pipe pressure will be obtained, following the quick service operation of the AB valves to apply to the brakes, to cause operation of said valves to release such brake application. Without this fading maintaining the brakes on all cars of the train except a few at the front end would undesirably release under such a condition.

Except for the false gradient condition just described there is no need for fading maintaining, hence the vent through the fading choke may be closed and thereby provide flat maintaining such as now considered very advantageous in controlling trains down grades. With the vent from the reduction limiting reservoir through the fading choke closed it will be seen that after effecting a certain reduction in equalizing reservoir pressure and thereby in brake pipe pressure, the maintaining valve would hold brake pipe pressure constant against leakage therefrom and thereby hold a brake application right at the degree chosen by the engineer. Due to this, when a train starts descent of a grade the brakes can be applied to a chosen degree at which they will remain unless a change in degree of brake application is necessary due to change in steepness of the grade, track curvature or the like. This practice with flat maintaining is considered a very decided improvement over the old practice of cycling necessary before compensating for brake pipe leakage, where after the brakes were applied to a desired degree brake pipe leakage would increase the application to a point requiring release of brakes and recharging of the brake system followed by another application etc. until the bottom of the grade was reached. Flat maintaining will practically eliminate such cycling.

The structure disclosed in the Stewart application will automatically condition a locomotive brake equipment to prevent undesired release of brakes in case a false gradient exists in the brake pipe at the time of initiating an application and will also provide flat maintaining for grade braking.

However, the amount of fluid under pressure supplied to the brake pipe by the maintaining valve depends not only on false gradient but also on leakage of fluid under pressure from the brake pipe and substantially the same rate of flow of fluid under pressure to the brake pipe via the maintaining valve will occur with a maximum degree of false gradient and substantially no brake pipe leakage as may occur with substantially no false gradient and maximum permissible brake pipe leakage. Fading maintaining is essential in the first instance. In the second instance flat maintaining is permissible and desirable, but the Stewart structure would provide fading maintenance in the second instance, as well as in the first, with the result that in the second instance an unnecessary reduction in equalizing reservoir pressure might occur with a resulting greater than desired application of brakes.

It is, however, known that after brake pipe pressure has been reduced, for example, ten pounds from that normally carried that, regardless of the degree of false gradient in the brake pipe, no undesired release of a brake application will occur and fading maintaining may therefore be positively cut out, if not cut out sooner, and another object of the invention is therefore the provision of means for automatically cutting out fading maintaining as soon as the brake pipe pressure at the locomotive is reduced a chosen amount below that present at the time of initiating an application of brakes.

Other objects and advantages will become apparent from the following more detailed description of the invention.

Figure 1:
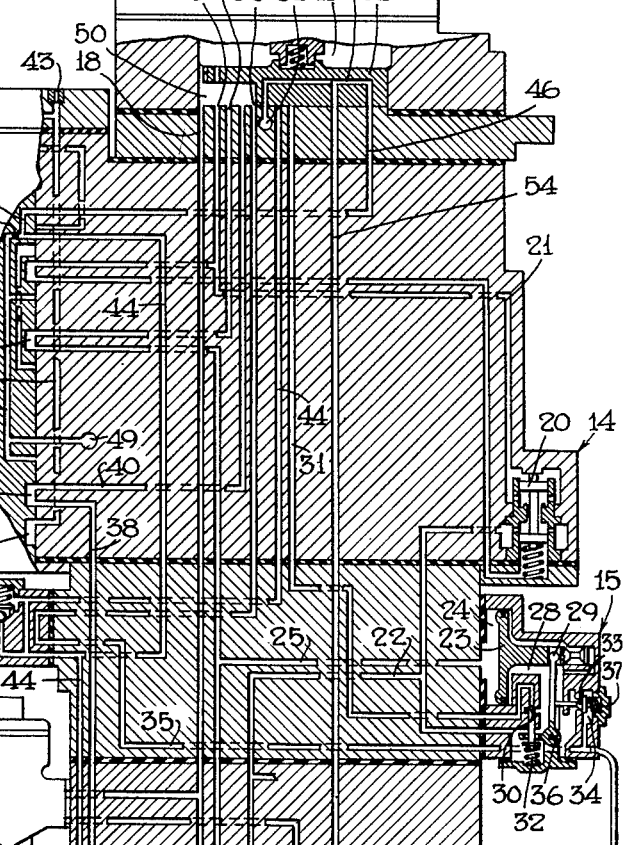

In the accompanying drawing; Fig. 1 is a diagrammatic view of a portion of a locomotive fluid pressure brake equipment embodying the invention; and Fig. 2 is a diagrammatic view of a portion of an engineer's brake valve device shown in Fig. 1 but with a rotary valve thereof in a first service position; said rotary valve being shown in the usual running position in Fig. 1.

Description

As shown in the drawing, the brake equipment comprises an engineer's automatic brake valve device 1, a main reservoir 2, a brake pipe 3, an equalizing reservoir 4, a reduction limiting reservoir 5 and a suppression reservoir 6 all of which may be identical to the brake equipment fully disclosed in Westinghouse Air Brake Company's Instruction Pamphlet No. 5066 dated March 1948, but only so much of these parts are shown in the drawing as deemed necessary to a clear understanding of the invention. According to the invention the equipment further comprises a fading and flat maintaining selector valve device 7, a maintaining cut-off valve device 8, a volume reservoir 9 and a check valve device 10.

The brake valve device 1 comprises a pedestal having a chamber 11 containing a rotary valve 12 adapted to be turned by a handle 13 to the usual brake controlling positions including a running position in which it is shown in Fig. 1 of the drawing and a first service position in which it is shown in Fig. 2. Associated with the pedestal is a brake pipe cut-off valve device 14, a combined equalizing discharge and maintaining valve device 15, a safety control and train control application valve device 16 and a feed valve device 17 adapted to supply fluid from the main reservoir 2 to a passage 18 leading to the rotary valve chamber 11 at the usual reduced pressure desired to be carried in the brake pipe 3.

The application valve device 16 is provided for automatically effecting a reduction in brake pipe pressure and thereby an application of brakes on a train in case of incapacitation of the locomotive engineer, a train exceeding a speed limit etc., as fully described in the Instruction Pamphlet above referred to. So far as the present application is concerned it is sufficient to point out that the application valve device 16 comprises a slide valve 19 having a normal position, in which it is shown in the drawing, and which provides for control of brakes on a train by operation of rotary valve 12, and also having an automatic application position above the normal position.

The cut-off valve device 14 is for automatically cutting off supply of fluid under pressure to the brake pipe 3 in case the application valve device 16 operates automatically to effect an application of brakes, but so far as the present application is concerned it is sufficient to point out that said cut-off valve device comprises a check valve 20 which, with the application slide valve 19 in normal position, is open to establish communication between a passage 21 connected to the seat of the rotary valve 12 and a passage 22 leading to the valve mechanism 15 and brake pipe 3.

The combined equalizing discharge and maintaining valve mechanism 15 may be identical to that fully disclosed in Patent No. 2,290,953 issued on July 28, 1942 to C. C. Farmer and, briefly, comprises an equalizing piston 23 at one side of which is a chamber 24 open to a passage 25 connected to the equalizing reservoir 4 and also through a cavity 26 in the application slide valve 19, when in normal position, to a passage 27 leading to the seat of the rotary valve 12. At the opposite side of the equalizing piston 24 is a chamber 28 open to the brake pipe passage 22. The piston 23 is connected to one arm 29 of a bell crank the other arm of which is connected to a brake pipe discharge valve 30 which controls communication between chamber 28 and thereby the brake pipe 3 and an exhaust passage 31 leading to the seat of the rotary valve 12. Upon movement of piston 23 toward the left-hand from the position in which it is shown in the drawing the discharge valve 30 is adapted to be unseated while upon return of said piston to said position a spring 32 is adapted to seat said valve. A maintaining valve 33 contained in a chamber 34, which is connected by a passage 35 to the seat of rotary valve 12, has a stem 36 projecting into chamber 28 for engagement by the bell crank arm 29 upon movement of the equalizing piston 23 in the direction of the right hand from the position in which it is shown in the drawing to open said valve. Upon return of piston 23 to such position a spring 37 is adapted to seat the maintaining valve 33. With the equalizing piston 23 in the position in which it is shown in the drawing both the discharge valve 30 and maintaining valve 33 are adapted to be seated by their respective springs.

The suppression reservoir 6 is connected by a pipe and passage 38 to the seat of the application slide valve 19. In the normal position of slide valve 19 a cavity 39 therein connects passage 38 to a passage 40 leading to the seat of rotary valve 12 while in application position of said slide valve this communication is broken and passage 38 is connected through a cavity 41 in said slide valve to a passage 42 which is open to atmosphere through a blow down choke 43.

The reduction limiting reservoir 5 is connected by a passage 44 to the seat of the rotary valve 12 and also to the seat of the application slide valve 19. In normal position of slide valve 19 a cavity 45 therein connects passage 44 to a passage 46 leading to the seat of the rotary valve 12. Heretofore the cavity 45 was open through a fading choke, now replaced by a plug 47, to a passage 48 in the slide valve 19 which in normal position thereof is open to an atmospheric passage 49.

The rotary valve 12 has a cavity 50 which in running position of handle 13 connects the feed valve passage 18 to the brake pipe passage 21, the equalizing reservoir passage 27, passage 40 connected to the suppression reservoir 6 and passage 35 connected to the maintaining valve chamber 34, whereby in this position of the brake valve device the brake pipe 3, equalizing reservoir 4, said timing reservoir and chamber will all become charged with fluid at the pressure supplied by the feed valve device 17 and which it is desired to normally provide in the brake pipe. With the brake pipe 3 and equalizing reservoir 4 thus charged with fluid at the same pressure, equal pressures will be acting in chambers 28 and 24 at opposite sides of the equalizing piston which will assume the position in which it is shown in the drawing with both the discharge valve 30 and maintaining valve 33 closed. The rotary valve 12 also has a cavity 51 which in running position connects passage 46 to an atmospheric passage 52 for venting the reduction limiting reservoir 5.

In first service position of the rotary valve 12 (Fig. 2) the brake pipe passage 21 is lapped by said valve to cut off supply of fluid under pressure to the brake pipe 3, and passage 46 from the reduction limiting reservoir 5 is also lapped. Passage 40 is connected through a passage 53 in the rotary valve to a passage 54 through which fluid under pressure is gradually vented from the suppression reservoir 6. The brake pipe exhaust passage 31 is opened through a passage 54a in the rotary valve to the atmospheric passage 52. A port 55 in the rotary valve opens the feed valve passage 18 to the maintaining valve chamber 34 via the rotary valve chamber 11 and passage 35, said port 55 constituting a restriction which is present in such communication. A passage 56 in the rotary valve connects the equalizing reservoir passage 27 to the reduction limiting reservoir 5.

It will thus be seen that when the brake pipe 3 and equalizing reservoir 4 are fully charged with fluid under pressure and the reduction limiting reservoir 5 is vented in running position of the brake valve device, if said brake valve device is turned to first service position the supply of fluid under pressure will be cut off to said brake pipe and the charged equalizing reservoir 4 will be opened to the vented reduction limiting reservoir 5. Pressure of fluid in the equalizing reservoir 4 and chamber 24 of the equalizing discharge and maintaining valve mechanism 15 will then equalize into the reduction limiting reservoir at the usual service rate. If there is leakage of fluid under pressure from the brake pipe 3 but the resultant reduction in pressure in chamber 28 does not exceed the service rate of reduction in equalizing reservoir pressure in chamber 24, then the equalizing piston 23 will move in the direction of the lower pressure in chamber 24 and open the discharge valve 30 for venting fluid under pressure from the brake pipe via chamber 28, passage 31 and the atmospheric passage 52. On the other hand if due to a false gradient in or leakage of fluid under pressure from the brake pipe the pressure in chamber 28 tends to reduce faster than equalizing reservoir pressure in chamber 24, the equalizing piston 23 will move toward the right hand and open the maintaining valve 33 for supplying fluid under pressure from the feed valve device 17 to the brake pipe to prevent pressure in the brake pipe reducing faster than the service rate of reduction in pressure in the equalizing reservoir 4. In either case an application of brakes will occur due to the reduction in brake pipe pressure.

The maintaining selector valve device 7 comprises a flexible diaphragm 57 at one side of which is a chamber 58 open through a pipe 59 to passage 35 while at the opposite side is a chamber 60 open through a pipe 61 to the feed valve supply passage 18, it being noted that the diaphragm 57 is thus subject on opposite sides, respectively, to pressures at opposite sides of the port 55 in the rotary valve 12 when in first service position. A spring 62 in chamber 58 acts on diaphragm 57 with a chosen force. Chamber 60 is separated from a chamber 63 by a partition 64 through which extends a plunger 65 provided in chamber 60 with a head 66 engaging said diaphragm. In chamber 63 plunger 65 engages a valve 67 controlling communication between chamber 63 and a chamber 68 which is open to atmosphere through a passage 69. Deflection of diaphragm 57 downwardly is adapted to seat the valve 67 while upon deflection in the opposite direction a spring 70 is adapted to unseat said valve. When the pressures of fluid acting on opposite sides of the diaphragm are substantially equal, as when the brake equipment is fully charged with the brake valve rotary valve 12 in running position, the valve 67 will be seated by spring 62.

Chamber 63 in the selector valve device 7 is open through a pipe 71 to a chamber 72a in the cut-off valve device 8 which comprises a valve 72 and a plunger 73 contained in a chamber 74 which is open to the reduction limiting reservoir passage 44 via a communication including a pipe 75 and a fading choke 76 formerly used in the application slide valve 19 in place of plug 47. The valve 72 and plunger 73 engage each other for movement in unison, the valve 72 controlling communication between chambers 74 and 72a while the plunger 73 extends into a chamber 77 through a bore in a partition wall separating chambers 74 and 77 and in sliding contact with the wall of said bore.

A flexible diaphragm 78 subject on one side to brake pipe pressure and chosen pressure of a spring 79 in chamber 77 is connected to the plunger 73 through a follower and stem 80 whereby upon deflection of said diaphragm, in the direction of said chamber, the plunger 73 will be operated to unseat the valve 72. Upon deflection of diaphragm 78 in the opposite direction a spring 81 will open valve 72. At the opposite side of diaphragm 78 is a chamber 82 adapted to be charged and then remain charged during an application of brakes with fluid at the pressure supplied by the feed valve device 17 and therefore normally present in the brake pipe 3. To provide such pressure in chamber 82 said chamber may be connected through a pipe 84, the check valve device 10 and a pipe 85 to the suppression reservoir 6, the check valve device 10 permitting said chamber to become charged along with the suppression reservoir 6 to fluid at the pressure normally provided in the brake pipe 3 in running position of the brake valve device and holding such pressure in said chamber upon reducing of pressure in the suppression reservoir 6 when said brake valve device is in first service position. The volume reservoir 9 is connected to pipe 84 to minimize effect of leakage of fluid under pressure through the check valve device 10 upon reducing pressure of fluid in the suppression reservoir 6 as above described.

It will now be seen that when the brake valve device is in running position with the brake equipment fully charged substantially the same pressures of fluid will be acting on opposite sides of diaphragm 78 to permit spring 79 to hold said diaphragm in the position in which it is shown in the drawing permitting spring 81 to open valve 72 for thereby opening the reduction limiting reservoir 5 through the fading maintaining choke 76 to pipe 71. When the brake valve device is moved to first service position and brake pipe pressure in chamber 77 is, as a result, reduced sufficiently below the bottled-up pressure, equal to normal brake pipe pressure, in chamber 82 to permit the pressure in chamber 82 to overcome spring 79, the diaphragm 78 will deflect to close valve 72 thereby closing communication between the fading choke 76 and pipe 71. The pressure of spring 79 is such that the valve 72 will be seated when a chosen reduction, such as ten pounds, has been effected in the pressure in the brake pipe in effecting an application of brakes. Until such chosen reduction is effected the reduction limiting reservoir 5 may therefore be open through pipe 75, the fading maintaining choke 76, past the unseated valve 72 and through pipe 71 to chamber 63 in the maintaining selector valve device 7.

When the brake valve rotary valve 12 is moved from running position to first service position to cut off the supply of fluid under pressure to the brake pipe and to connect the equalizing reservoir 4 to the reduction limiting reservoir 5, leakage of fluid under pressure from the brake pipe 3, usually present in all trains, will start to reduce the pressure therein and in the equalizing piston chamber 28, but if the rate of such reduction is not equal to the service rate of reduction in pressure in the equalizing reservoir 4, then when the equalizing reservoir pressure in chamber 24 becomes reduced slightly below brake pipe pressure in chamber 28, the piston 23 will operate to open the discharge valve 30 to increase the rate of brake pipe reduction to the desired degree. If the degree of leakage of fluid under pressure from the brake pipe 3 were such as would cause brake pipe pressure to reduce at a rate exceeding the service rate of reduction in equalizing reservoir pressure, then as soon as the pressure in chamber 28 becomes reduced slightly below reducing equalizing reservoir pressure in chamber 24, the piston 23 will operate to unseat the maintaining valve 33 to supply fluid under pressure to the brake pipe in an amount sufficient to prevent the leakage from reducing the pressure therein faster than the service rate of reduction in pressure in the equalizing reservoir 4. Still further, if a false gradient exists in the brake pipe at the time the brake valve device is moved to first service position and under which condition there will be a more rapid rate of runaway of fluid under pressure from the brake pipe at the locomotive toward the rear of the train than ever exists with maximum permissible leakage of fluid under pressure from the brake pipe, then the maintaining valve 33 will be opened to a greater extent than above described in order to supply more fluid under pressure to the brake pipe as necessary to prevent the pressure therein at the locomotive reducing faster than the service rate of reduction in equalizing reservoir pressure.

It is to be noted that fluid supplied to the brake pipe 3 from the feed valve device 17 is obtained via the restricted port 55 in the rotary valve 12 and the differential in pressures in passages 18 and 35 at opposite sides of this port will be proportional to the rate at which fluid under pressure is supplied to the brake pipe by the maintaining valve 33 and hence proportional to the rate of flow of fluid under pressure from the brake pipe at the locomotive back through the train as governed by leakage or false gradient. This differential is effective on diaphragm 57 in the maintaining selector valve device 7 and the pressure of spring 62 is such as to hold the valve 67 seated except when said diaphragm is subject to the differential resulting from greater than permissible brake pipe leakage and hence when there is a false gradient in the brake pipe at the time the rotary valve 12 is turned to first service position. Therefore when there is no false gradient in the brake pipe at the time of initiating an application of brakes by moving the brake valve device to first service position the valve 67 will be closed to limit the degree of reduction in pressure in equalizing reservoir 4 to equalization into the reduction limiting reservoir 5. If a false gardient exists however the valve 67 will be open so that after equalization of pressure in the equalizing reservoir 4 into the reduction limiting reservoir 5 occurs, pressure of fluid in the equalizing reservoir will continue to reduce by flow through the fading choke 76 in order to prevent undesired release of brakes on a train as before described. Regardless of whether the valve 67 is open or closed when the pressure of fluid in the brake pipe 3 and chamber 77 of the cut-off valve device 8 becomes reduced ten pounds below the initial pressure present in said brake pipe diaphragm 78 will be deflected by pressure in chamber 82 to close valve 72 and prevent further reduction in equalizing reservoir pressure through the fading choke 76 even if the valve 67 is open.

It will thus be seen that when initiating an application of brakes the fading choke 76 will be effective to continue the reduction in pressure in equalizing reservoir 4 only in case of a false gradient in the brake pipe, the maintaining valve 33 operating under this condition to provide fading maintenance of pressure of fluid in the brake pipe. If there is no false gradient in the brake pipe at the time of initiating an application of brakes the vent through the fading choke 76 will be closed so that the maintaining valve 33 will operate to provide flat maintenance, that is, maintain brake pipe pressure equal to the bottled-up pressure in the equalizing and reduction limiting reservoir.

After a slight slack gathering application of brakes has been effected on a train as above described, the engineer will move the rotary valve 12 to the usual service position (not shown) to increase the reduction in pressure in the equalizing reservoir 4 and thereby in the brake pipe 3 to such degree as necessary to provide a desired braking force on the train, following which, instead of moving the brake valve device to the usual lap position it will be returned to first service position where the maintaining valve 33 will function to maintain the pressure in the brake pipe against leakage equal to the reduced and bottled-up pressure in the equalizing reservoir 4.

In service position of the brake valve rotary valve 12 the reduction limiting reservoir 5 may be vented or the fluid pressure therein bottled up by the rotary valve 12 lapping passage 44 and will be reconnected to the equalizing reservoir 5 upon return of the brake valve device to first service position. At this time of reconnecting, the pressure in the reduction limiting reservoir may therefore be atmospheric or slightly higher than in the equalizing reservoir and equalization of pressures in the two reservoirs will occur, but the reduction limiting reservoir is only about 10 per cent the volume of the equalizing reservoir so that the resulting slight change in pressure in the equalizing reservoir will have no material effect upon the application of train brakes when the brake valve is turned from the usual service position to first service position as just described.

Summary

It will now be seen that I have provided improved means for automatically providing fading maintenance of pressure of fluid in the brake pipe of a train as necessary to avoid an undesired release of brakes when an application is initiated at a time when a false gradient is present in the brake pipe and for ensuring that such maintenance will be cut out when no longer useful, and providing at all other times flat maintenance of brake pipe pressure against leakage as particularly desirable for handling of trains down a grade.

Having now described my invention, what I claim as new and desire to secure by Letters Patent, is:

1. In a fluid pressure brake apparatus, in combination, a brake pipe, an equalizing reservoir, a reduction limiting reservoir, a feed valve device for supplying fluid at a chosen pressure, a brake valve device having one position for opening said brake pipe and equalizing reservoir to said feed valve device and for opening a vent from said reduction limiting reservoir and having another position for closing communication between said feed valve device and said brake pipe and equalizing reservoir, for closing said vent and for also opening said equalizing reservoir to said reduction limiting reservoir to reduce the pressure in said equalizing reservoir, an equalizing valve device controlled by opposing pressures of fluid in said equal reservoir and brake pipe and operative upon movement of said brake valve device to said other position to either vent fluid under pressure from said brake pipe or to establish a communication from said feed valve device to said brake pipe for supplying fluid under pressure to said brake pipe as necessary to maintain pressure of fluid in said brake pipe equal substantially to pressure of fluid in said equalizing reservoir, another vent for said reduction limiting reservoir, a restriction in said communication, and means responsive to the different pressures of fluid at opposite sides of said restriction for opening said other vent when the differential between said different pressures is in excess of a chosen degree and for closing said other vent for all less differential between said different pressures.

2. In a fluid pressure brake apparatus, in combination, a brake pipe, an equalizing reservoir, a reduction limiting reservoir, a feed valve device for supplying fluid at a chosen pressure, a brake valve device having one position for opening said brake pipe and equalizing reservoir to said feed valve device and for opening a vent from said reduction limiting reservoir and having another position for closing communication between said feed valve device and said brake pipe and equalizing reservoir, for closing said vent and for also opening said equalizing reservoir to said reduction limiting reservoir to reduce the pressure in said equalizing reservoir, an equalizing valve device controlled by opposing pressures of fluid in said equal reservoir and brake pipe and operative upon movement of said brake valve device to said other position to either vent fluid under pressure from said brake pipe or to establish a communication from said feed valve device to said brake pipe for supplying fluid under pressure to said brake pipe as necessary to maintain pressure of fluid in said brake pipe equal substantially to pressure of fluid in said equalizing reservoir, another vent for said reduction limiting reservoir, and means controlled by fluid at the pressure supplied by said feed valve device and that acting in said brake pipe operative to close said other vent upon a chosen reduction in pressure in said brake pipe below that supplied by said feed valve device.

3. In a fluid pressure brake apparatus, in combination, a brake pipe, a normally charged equalizing reservoir, a normally vented reduction limiting reservoir, a brake valve device for opening said equalizing reservoir to said reduction limiting reservoir to reduce the pressure in said equalizing reservoir, equalizing valve means, including a brake pipe discharge valve and a brake pipe maintaining valve controlled by opposing pressures of fluid in said brake pipe and equalizing reservoir and operative upon opening of said equalizing reservoir to said reduction limiting reservoir to operate either said discharge valve to vent fluid under pressure from said brake pipe or said maintaining valve to supply fluid under pressure to said brake pipe, as necessary to maintain pressure in said brake pipe equal substantially to pressure of fluid in said equalizing reservoir, a vent for said reduction limiting reservoir, and means controlling said vent controlled by pressure of fluid in said brake pipe and an opposing pressure equal to that in said brake pipe when fully charged and operative to close said vent in response to a chosen reduction in pressure in said brake pipe below said opposing pressure.

4. In a fluid pressure brake apparatus, in combination, a brake pipe, an equalizing reservoir, a reduction limiting reservoir, a brake valve device having one position for charging said brake pipe and equalizing reservoir with fluid under pressure and for opening a vent from said reduction limiting reservoir and having another position for closing said vent and for cutting off supply of fluid under pressure to said brake pipe and equalizing reservoir and for opening said equalizing reservoir to said reduction limiting reservoir to reduce pressure in said equalizing reservoir, an equalizing valve device controlled by opposing pressures of fluid in said brake pipe and equalizing reservoir and operative upon movement of said brake valve device to said other position to either vent fluid under pressure from said brake pipe or to establish a communication for supplying fluid under pressure to said brake pipe as necessary to maintain pressure of fluid in said brake pipe equal substantially to pressure of fluid in said equalizing reservoir, a restriction in said communication, a restricted communication for releasing fluid under pressure from said reduction limiting reservoir, and selector valve and cut-off valve devices controlling said restricted communication, said selector valve device comprising means responsive to pressures of fluid at opposite sides of said restriction and operative to close the last named communication in response to a differential between such pressures less than a chosen degree and to open the last named communication in response to any greater differential between such pressures, and said cut-off valve device comprising means controlled by maximum pressure of fluid in said brake pipe acting in opposition to reducing pressure of fluid in said brake pipe for closing said last named communication upon a chosen reduction in brake pipe pressure below said maximum pressure.

5. In a fluid pressure brake apparatus, in combination, a brake pipe, an equalizing reservoir, a reduction limiting reservoir, a third reservoir, a brake valve device having one position for charging said brake pipe, said equalizing reservoir and said third reservoir with fluid under pressure and for venting said reduction limiting reservoir and having another position for closing the charging communication to said brake pipe, said equalizing reservoir and third reservoir, for closing the vent from said reduction limiting reservoir and for also opening said equalizing reservoir to said reduction limiting reservoir to reduce the pressure in said equalizing reservoir, and for opening a vent from said third reservoir, equalizing valve means controlled by opposing pressures of fluid in said brake pipe and equalizing reservoir operative in said other position of said brake valve device to either vent fluid under pressure from said brake pipe or open a fluid pressure supply communication to said brake pipe as necessary to hold pressure of fluid in said brake pipe substantially equal to pressure of fluid in said equalizing reservoir, another vent from said reduction limiting reservoir, a restriction in said fluid pressure supply communication, means responsive to different pressures at opposite sides of said restriction upon flow of fluid under pressure through said communication for closing the last named vent except upon a differential between said different pressures in excess of a chosen degree, other means controlled by pressure of fluid in said brake pipe and opposing pressure of fluid in a chamber and operative upon a chosen reduction in brake pipe pressure below that in said chamber to also close the last named vent, a communication for charging said last named chamber with fluid under pressure from said third reservoir, and a check valve in the last named communication for preventing reverse flow of fluid under pressure therethrough.

References Cited in the file of this patent

UNITED STATES PATENTS

| Number | Name | Date |
|---|---|---|
| 1,765,509 | Thomas | Jan. 24, 1930 |
| 2,038,168 | Farmer | Apr. 21, 1936 |
| 2,322,042 | McClure | June 15, 1943 |